United States Patent
Carolla et al.

(10) Patent No.: US 10,294,085 B2
(45) Date of Patent: May 21, 2019

(54) METHODS AND APPARATUS FOR CONSTRUCTING GLASS FURNACE STRUCTURES

(71) Applicant: FOSBEL, INC., Brook Park, OH (US)

(72) Inventors: Lou Carolla, Brook Park, OH (US); Michael Smith, Brook Park, OH (US); Alan E. Bowser, Jr., Brook Park, OH (US)

(73) Assignee: FOSBEL, INC., Brook Park, OH (US)

( * ) Notice: Subject to any disclaimer, the term of this patent is extended or adjusted under 35 U.S.C. 154(b) by 585 days.

(21) Appl. No.: 15/013,199

(22) Filed: Feb. 2, 2016

(65) Prior Publication Data

US 2016/0221801 A1 Aug. 4, 2016

Related U.S. Application Data

(60) Provisional application No. 62/111,398, filed on Feb. 3, 2015.

(30) Foreign Application Priority Data

Feb. 25, 2015 (GB) .................................. 1503159.4

(51) Int. Cl.
*C03B 5/42* (2006.01)
*F27D 1/00* (2006.01)
(Continued)

(52) U.S. Cl.
CPC ............ *B66C 17/06* (2013.01); *C03B 5/2375* (2013.01); *C03B 5/42* (2013.01); *F27D 1/16* (2013.01);
(Continued)

(58) Field of Classification Search
CPC .... B66C 5/02; B66C 7/02; B66C 7/04; B66C 7/06; B66C 17/24; B66C 17/20
(Continued)

(56) References Cited

U.S. PATENT DOCUMENTS

| | | | | |
|---|---|---|---|---|
| 1,437,967 A | * | 12/1922 | Fitch | ........................ B66C 17/20 |
| | | | | 212/331 |
| 1,437,968 A | * | 12/1922 | Fitch | ........................ B66C 17/20 |
| | | | | 212/312 |

(Continued)

FOREIGN PATENT DOCUMENTS

CN 202578055 12/2012
GB 2 151 004 7/1985
(Continued)

OTHER PUBLICATIONS

International Search Report, PCT/US2016/016056, dated Apr. 15, 2016.
Search Report for GB1503159.4 dated Aug. 26, 2015, one (1) page.

*Primary Examiner* — Jason L Vaughan
(74) *Attorney, Agent, or Firm* — Nixon & Vanderhye P.C.

(57) ABSTRACT

Methods and apparatus are provided for constructing refractory structures, e.g., glass furnace regenerator structures and/or glass furnace structures formed of refractory components, the refractory structure being housed within a building having a roof support elements. Cross-support beams are provided to latitudinally span the refractory structure and are suspended from roof support elements associated with the building housing the refractory structure by a suspension support system attached to the cross-support beams. An overhead crane assembly may thus be supported by the cross-support beams.

9 Claims, 2 Drawing Sheets

Figure 1:
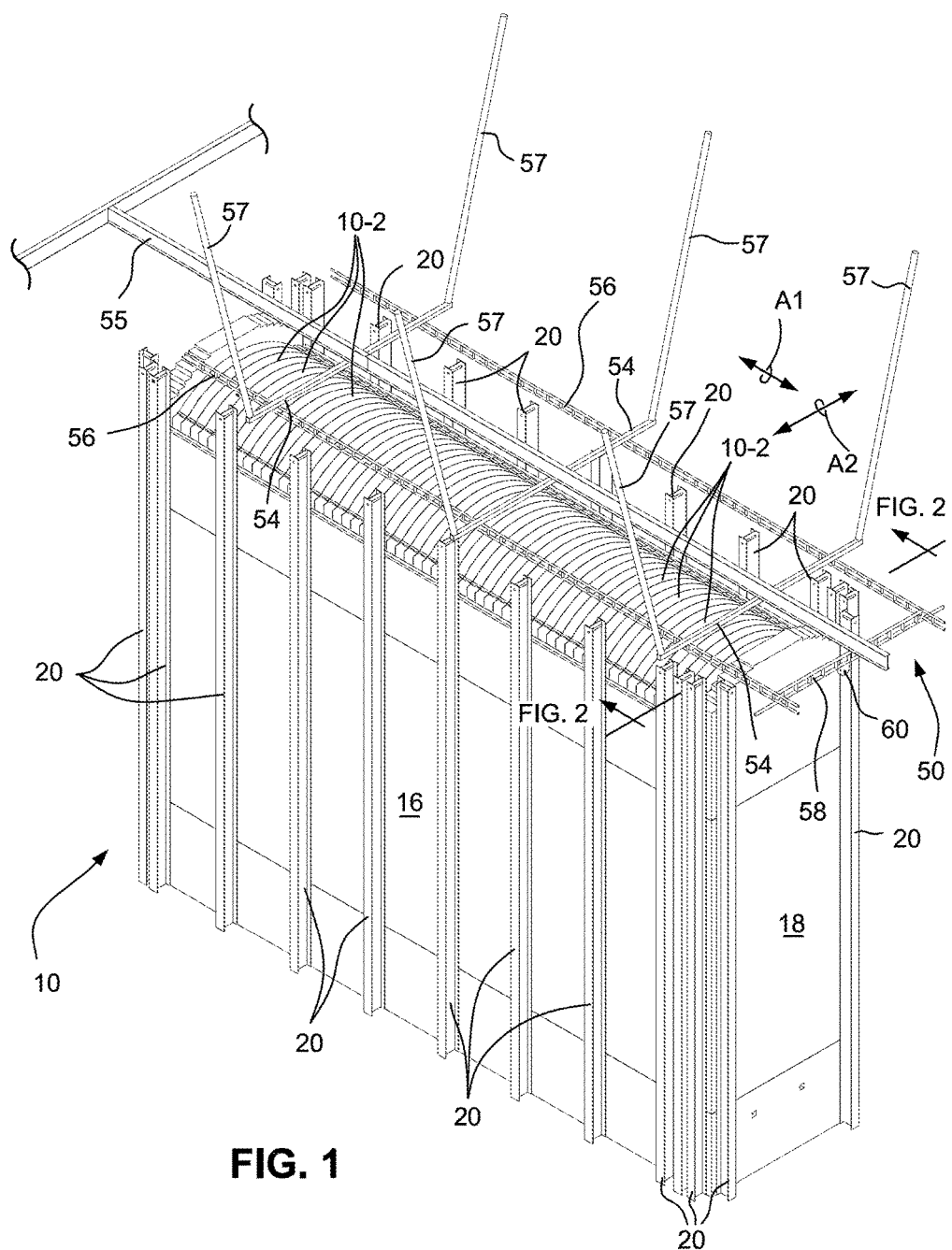

(51) Int. Cl.
*F27D 1/16* (2006.01)
*B66C 17/06* (2006.01)
*C03B 5/237* (2006.01)

(52) U.S. Cl.
CPC .... *F27D 1/1621* (2013.01); *F27D 2001/0079* (2013.01); *F27D 2201/00* (2013.01)

(58) Field of Classification Search
USPC .................................. 212/319, 324, 325, 271
See application file for complete search history.

(56) References Cited

U.S. PATENT DOCUMENTS

| | | | |
|---|---|---|---|
| 3,427,009 A | 2/1969 | Shute | |
| 3,589,316 A | 6/1971 | Longenecker | |
| 3,732,052 A * | 5/1973 | Gunia | B28B 15/00 425/219 |
| 4,064,616 A | 12/1977 | Kubota et al. | |
| 4,394,217 A * | 7/1983 | Holz | C10B 33/06 202/227 |
| 4,688,773 A | 8/1987 | Legille et al. | |
| 6,539,602 B1 * | 4/2003 | Ozawa | C10B 29/02 29/402.03 |
| 7,004,338 B2 * | 2/2006 | Franzen | B65G 1/0464 212/319 |
| 7,066,094 B2 * | 6/2006 | Moutsokapas | B66C 7/04 104/123 |
| 7,066,343 B1 * | 6/2006 | Khachaturian | B66C 5/02 212/270 |
| 2003/0161708 A1 * | 8/2003 | Johnston | B66C 19/005 414/460 |
| 2008/0083688 A1 * | 4/2008 | Lerchenmueller | B61F 5/16 212/312 |
| 2011/0247993 A1 * | 10/2011 | Chernyak | B66C 6/00 212/324 |

FOREIGN PATENT DOCUMENTS

| | | |
|---|---|---|
| JP | 59-75980 | 4/1984 |
| JP | 2001-19969 | 1/2001 |
| JP | 2012-127593 | 7/2012 |
| WO | 2008/113132 | 9/2008 |

* cited by examiner

METHODS AND APPARATUS FOR CONSTRUCTING GLASS FURNACE STRUCTURES

CROSS-REFERENCE TO RELATED APPLICATIONS

This application is based on and claims domestic priority benefits under 35 USC § 119(e) from U.S. Provisional Application Ser. Nos. 62/111,398 filed on Feb. 3, 2015 and also claims foreign priority benefits under 35 USC § 119(a) from GB 1503159.4 filed on Feb. 25, 2015, the entire contents of each such prior filed application being expressly incorporated hereinto by reference.

FIELD

The embodiments disclosed herein relate generally to methods and apparatus for constructing refractory structures associated with glass furnaces.

BACKGROUND

In the manufacturing process for making glass, raw materials including sand, lime, soda ash and other ingredients are fed into a furnace, sometimes called a glass tank. The raw materials are subjected to temperatures above about 2,800° F. in the glass furnace which causes the raw materials to melt and thereby form a molten bed of glass that exits the glass furnace for further downstream processing into glass products.

The most common way of heating the glass furnace is through the combustion of a hydrocarbon fuel source, such as natural gas or oil. The hydrocarbon fuel is mixed with combustion air inside the furnace and combusted to thereby transfer the combustion heat energy to the raw materials and glass melt prior to exiting the furnace.

In order to improve the thermal efficiency of the combustion process, the combustion air used to combust the fuel is preheated by means of regenerator structures. More specifically, a supply of combustion air is preheated in a honeycombed pack of checker bricks contained within the interior of the regenerator structure. Fresh combustion air is drawn up through the pack of heated checker bricks in the regenerator structure and preheated by means of heat transfer. The pre-heated combustion air may then be mixed with the fuel, combusted. Waste combustion gas exits the glass furnace and passes through a second regenerator structure. As the waste gasses pass through the second regenerator the checkers in the pack are heated by means of heat transferred from the waste gas. After a predetermined time has elapsed (e.g., after about 15-30 minutes), the process cycle is reversed so that the checker bricks in one of the regenerator structures that were being heated by heat transfer with the waste gas are then used to preheat the fresh combustion air while the checker bricks in the other regenerator structures that were used to preheat the combustion air are then re-heated by heat transfer with the waste combustion gas. See in this regard, U.S. Pat. No. 3,326,541 (the entire content of which is expressly incorporated hereinto by reference).

The current process for building glass furnace refractory structures, e.g., regenerators, glass furnaces including glass furnace refiners, fore hearths and the like, is very labor intensive taking many weeks as it requires the placement of hundreds of thousands of refractory bricks that may be individually coated with mortar and positioned or in some cases essentially dry set with minimal (if any) mortar. As is well known in the glass making industry, the joints associated with the bricks of the furnace refractory structures are the weakest part of the structure and are consequently more readily susceptible to degradation by the corrosive hot gasses passing therethrough. As the brick joints begin to erode, the walls forming the refractory structure face increased attack as the corrosive gasses begin to condense and dissolve the refractory materials forming the bricks thereby weakening the structure. As the structure becomes weakened, the glass furnace itself may become compromised and fail which could then require a complete shut down and rebuilding operation.

It can be appreciated therefore, that if the refractory structures could be fabricated from larger refractory blocks, then fewer joints would ensue thereby prolonging the regenerator structure's useful life and minimizing down time due to rebuilding. However, while large refractory blocks can be fabricated by pressing, molding or casting a refractory material, it is problematic to install such blocks during construction of a large-scale refractory structure.

In addition to the problems noted above, many of the components of the refractory structure, e.g., checker bricks used in glass regenerator structures, need to be replaced near or at the end of their useful life in order to maintain optimal production efficiencies. It is currently difficult to replace such components, e.g., the checker bricks, when it may be desired for them to do so.

What has been needed therefore are improvements in apparatus and methods whereby refractory structures may be efficiently and economically constructed and/or re-built. It is towards providing such improvements that the embodiments of the present invention are directed.

SUMMARY

In general, the embodiments disclosed herein are directed toward methods and apparatus for constructing refractory structures, e.g., glass furnace regenerator structures and/or glass furnace structures formed of refractory components, the refractory structure being housed within a building having a roof support elements. Cross-support beams are provided to latitudinally span (i.e., in a cross-wise direction) the refractory structure and are suspended from roof support elements associated with the building housing the refractory structure by a suspension support system attached to the cross-support beams. An overhead crane assembly may thus be supported by the cross-support beams. The cross-support beams may be connected rigidly to a longitudinally oriented lower roof support beam of the building housing the refractory structure.

According to some embodiments, the suspension support system comprises a pair of suspension supports attached to respective ends of the cross-support beams. Other embodiments may have a pair of rigid suspension beams attached to the cross-support beam.

The overhead crane assembly may comprise a pair of raceway beams longitudinally extending relative to the refractory structure and dependently supported by the cross-support beams, a bridge beam moveable mounted to the pair of raceway beams for reciprocal movements therealong in a longitudinal direction of the refractory structure, and a hoist moveably mounted to the bridge beam for reciprocal movements therealong in a latitudinal direction of the refractory structure.

One end portion of the raceway beams may be supported in a cantilever manner according to some embodiments by a respective pair of support beams and cross-support beam and so as to extend beyond a respective end of the refractory structure.

According to certain embodiments, methods of constructing a crane assembly relative to a refractory structure formed of refractory components, the refractory structure being housed within a building having a roof support elements, will include (i) spanning the refractory structure latitudinally with cross-support beams, (ii) supporting the cross-support beams by a suspension support system attached to the roof support elements of the building housing the refractory structure, and (iii) supporting an overhead crane assembly by the cross-support beams.

The cross-support beams may be attached respective pairs of suspension supports attached to opposed ends thereof, whereby the suspension supports may be in the form of tension support cables and/or rigid suspension beams.

Some embodiments are practiced by rigidly connecting the cross-support beams to a longitudinally oriented lower roof support beam of the building housing the refractory structure.

The refractory structure may a glass furnace regenerator structure having walls comprised of refractory blocks and an interior comprised of checker bricks, in which case the method may include operating the overhead crane assembly so as to position the refractory blocks and/or the checker bricks. Other refractory structures associated with glass furnace systems, e.g., cross-fired glass furnaces, end-fired glass furnaces and electric glass furnace systems may be provided with the crane assemblies as disclosed herein.

These and other aspects and advantages of the present invention will become more clear after careful consideration is given to the following detailed description of the preferred exemplary embodiments thereof.

BRIEF DESCRIPTION OF ACCOMPANYING DRAWINGS

Figure 2:
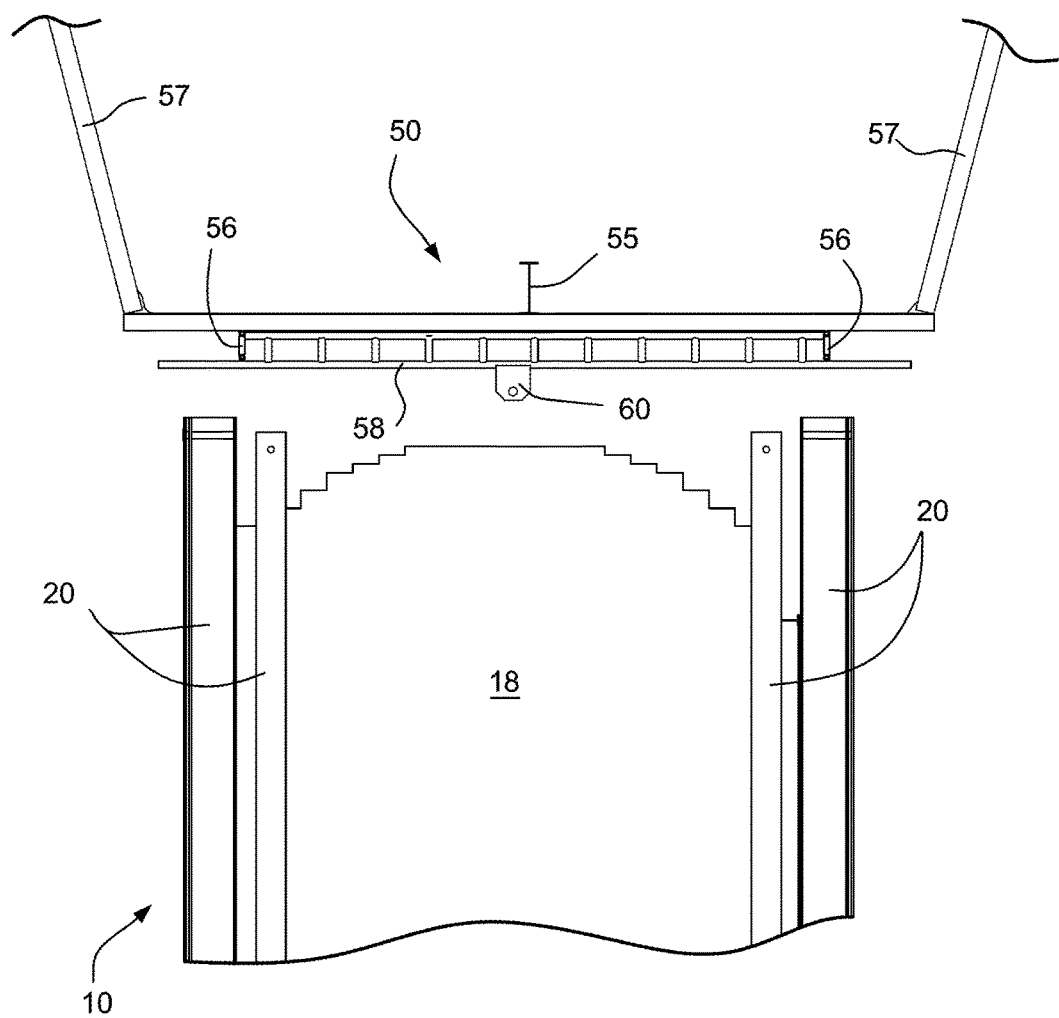

The disclosed embodiments of the present invention will be better and more completely understood by referring to the following detailed description of exemplary non-limiting illustrative embodiments in conjunction with the drawings of which:

FIG. 1 is a perspective view of a regenerator structure showing an apparatus in accordance with an embodiment of the present invention; and FIG. 2 is an enlarged partial end elevation view taken along line 2-2 in FIG. 1.

DETAILED DESCRIPTION

Accompanying FIG. 1 schematically depicts a perspective view of a regenerator structure 10 showing an overhead crane apparatus 50 in accordance with an embodiment of the present invention. As is known, the regenerator structure 10 is constructed of large pre-cast refractor blocks stacked on a foundation to thereby side and end walls 16, 18, respectively. It will be appreciated that the regenerator structure 10 is used in operative combination with a glass furnace (not shown). The regenerator structure 10 generally depicted in the accompanying FIGURES is of a type used for side-fired glass furnaces. However, the attributes of the embodiments of the invention to be described herein are equally applicable to other glass furnace designs, e.g. end-fired glass furnaces.

The regenerator structure 10 includes a series of ports (not shown) which are used to introduce pre-heated combustion air into the glass furnace (not shown) or to exhaust combustion gas from the furnace depending on the operational cycle. The top of the regenerator structure 10 is capped with crowns (a representative few of which are noted by reference numeral 10-2). The walls 16, 18 are structurally supported by external upright structural beams known colloquially as buck stays 20. As is known, the buck stays 20 are compressively held against the walls by means of tie rods (not shown) extending between opposed pairs of buck stays 20 both latitudinally and longitudinally relative to the regenerator structure 10.

The overhead crane apparatus 50 in accordance with an embodiment of the invention is depicted as including cross-support beams 54 latitudinally spanning the regenerator structure 10. The cross-support beams are preferably attached to a lower roof support beam 57 associated with a building (not shown) housing the refractory structure 10 and extending longitudinally relative thereto. Attachment of the cross-support beams 54 to the lower roof support beam 55 may be accomplished by any convenient means, e.g., clamping, riveting, welding or the like, which does not weaken the structural integrity of the lower roof support beam 55.

The cross-support beams 54 are further supported from upper roof trusses or like structures (not shown) associated with the building housing the refractory structure 10 by opposed pairs of suspension supports 57, e.g., tensioned suspension cables and/or rigid support beams). One end of the suspension supports 57 is attached to a respective lateral end of a cross-support beam 54 while the opposite end thereof is attached to portion of a correspondingly positioned upper roof truss or like structure.

The cross-support beams 54 dependently support a pair of runway beams 56 between which is connected a travelling bridge beam 58. The bridge beam 58 includes an overhead travelling hoist system 60. According to preferred embodiments, the runway beams 56 are supported in a cantilever manner by the end-most cross-support beams 54 so that the terminal end portions of such runway beams 56 extend beyond the wall 18 of the regenerator structure 10 thereby enabling access to refractory structures or other heavy equipment therebelow.

Suitable operator controlled motors (not shown) are provided with the bridge beam 58 to allow it to reciprocally travel along the runway beams 56 in a longitudinal direction of the regenerator structure (i.e., in the direction of arrow A1 in FIG. 1). Similarly, operator controlled motors (not shown) are provided with the hoist 60 to allow it to travel reciprocally along the bridge beam in a latitudinal direction of the regenerator structure 10 (i.e., in a direction of arrow A2 in FIG. 1). The hoist 60 may be connected to a suitable lifting sling or the like to allow refractory elements (e.g., checker bricks, refractory blocks, refractory bricks and the like) to be lifted up and into the interior of the regenerator structure 10, e.g., by suitably operating the bridge beam 58 and hoist 60 so as to travel in the directions of arrows A1 and A2 while simultaneously causing the hoist 60 to raise or lower the secured load (i.e., in a direction transverse to arrows A1 and A2). In such a manner, therefore, the checker bricks within the regenerator structure 10 may be replaced and/or refractory blocks/bricks associated with the walls 16 and/or 18 may be installed as may be needed.

Although pairs of runway beams 56 are depicted in the accompanying drawing FIGS. 1-2 as supporting a travelling bridge beam 58, the latter in turn supporting the hoist 60, the present invention could be embodied in one or more monorail systems whereby the travelling hoist 60 is carried by a monorail extending the lengthwise extent of the refractory structure. In such an embodiment, the monorail may be connected directly to the cross-support beams 54 or may be connected thereto via suitable hangers as described more fully in commonly owned U.S. application Ser. No. 14/859,820 filed Sep. 21, 2015, the entire content of which is expressly incorporated hereinto by reference).

Therefore, although the embodiments have been described in relation to a cross-fired glass furnace system, the principles of the invention may likewise be embodied in any glass furnace design, such as float furnaces, end-fired furnaces, unit melters with recuperators and electric furnaces with shelf, sidewall or bottom electrodes.

It will therefore be understood that the description provided herein is presently considered to be the most practical and preferred embodiments of the invention. Thus, the invention is not to be limited to the disclosed embodiments, but on the contrary, is intended to cover various modifications and equivalent arrangements included within the spirit and scope thereof.

What is claimed is:

1. A method of constructing a crane assembly relative to a refractory structure formed of refractory components, the refractory structure being housed within a building having roof support elements, wherein the method comprises:
    (i) spanning the refractory structure in a cross-wise direction thereof with cross-support beams;
    (ii) supporting the cross-support beams by a suspension support system which comprises pairs of tensioned support cables attached between opposed ends of the cross-support beams and the roof support elements of the building housing the refractory structure; and
    (iii) supporting an overhead crane assembly by the cross-support beams.

2. The method according to claim 1, wherein the refractory structure is at least one of a regenerator structure and a glass furnace structure.

3. The method according to claim 2, wherein the suspension supports comprise rigid suspension beams.

4. The method according to claim 1, wherein the refractory structure is a glass furnace regenerator structure having walls comprised of refractory blocks and an interior comprised of checker bricks, and wherein the method further comprises operating the overhead crane assembly so as to position the refractory blocks and/or the checker bricks.

5. A method of constructing a crane assembly relative to a refractory structure formed of refractory components, the refractory structure being housed within a building having roof support elements, wherein the method comprises:
    (i) spanning the refractory structure in a cross-wise direction thereof with cross-support beams;
    (ii) supporting the cross-support beams by a suspension support system attached to the roof support elements of the building housing the refractory structure; and
    (iii) supporting an overhead crane assembly by the cross-support beams, wherein
    step (i) comprises rigidly connecting the cross-support beams to a longitudinally oriented lower roof support beam of the building housing the refractory structure.

6. The method according to claim 5, wherein the refractory structure is a glass furnace regenerator structure having walls comprised of refractory blocks and an interior comprised of checker bricks, and wherein the method further comprises operating the overhead crane assembly so as to position the refractory blocks and/or the checker bricks.

7. A method of constructing a crane assembly relative to a refractory structure formed of refractory components, the refractory structure being housed within a building having roof support elements, wherein the method comprises:
    (i) spanning the refractory structure in a cross-wise direction thereof with cross-support beams;
    (ii) supporting the cross-support beams by a suspension support system attached to the roof support elements of the building housing the refractory structure; and
    (iii) supporting an overhead crane assembly by the cross-support beams, and wherein
    the method further comprises:
    (a) installing a pair of raceway beams which longitudinally extend relative to the refractory structure and are dependently supported by the cross-support beams;
    (b) moveably mounting a bridge beam to the pair of raceway beams for reciprocal movements therealong in a longitudinal direction of the refractory structure; and
    (c) moveably mounting a hoist to the bridge beam for reciprocal movements therealong in a latitudinal direction of the refractory structure, wherein
    step (a) includes installing the raceway beams so that one end portion of the raceway beams is supported in a cantilever manner by a cross-support beam to thereby cause the one end of the raceway beams to extend beyond a respective end of the refractory structure.

8. The method according to claim 5 or 7, wherein the refractory structure is at least one of a regenerator structure and a glass furnace structure.

9. The method according to claim 7, wherein the refractory structure is a glass furnace regenerator structure having walls comprised of refractory blocks and an interior comprised of checker bricks, and wherein the method further comprises operating the overhead crane assembly so as to position the refractory blocks and/or the checker bricks.

* * * * *